United States Patent Office 3,120,362
Patented Feb. 4, 1964

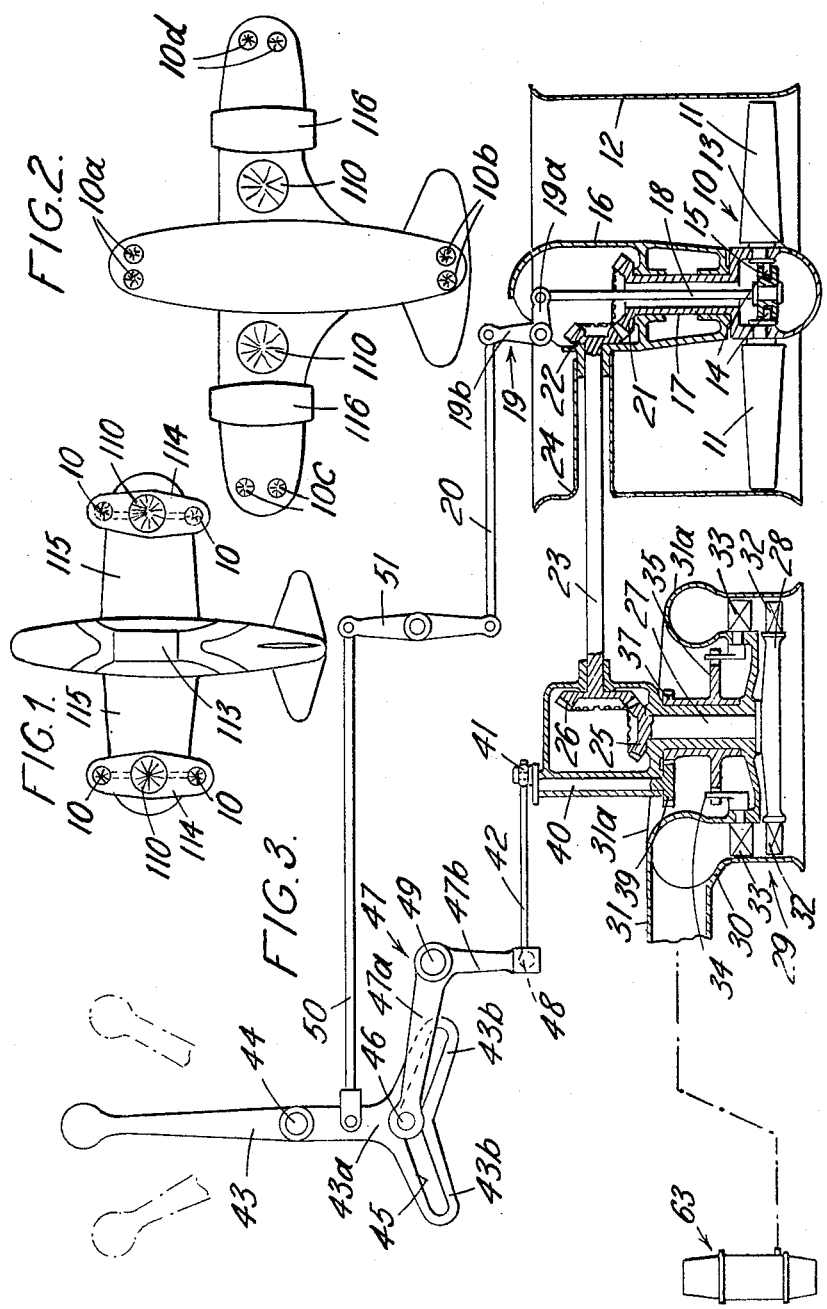

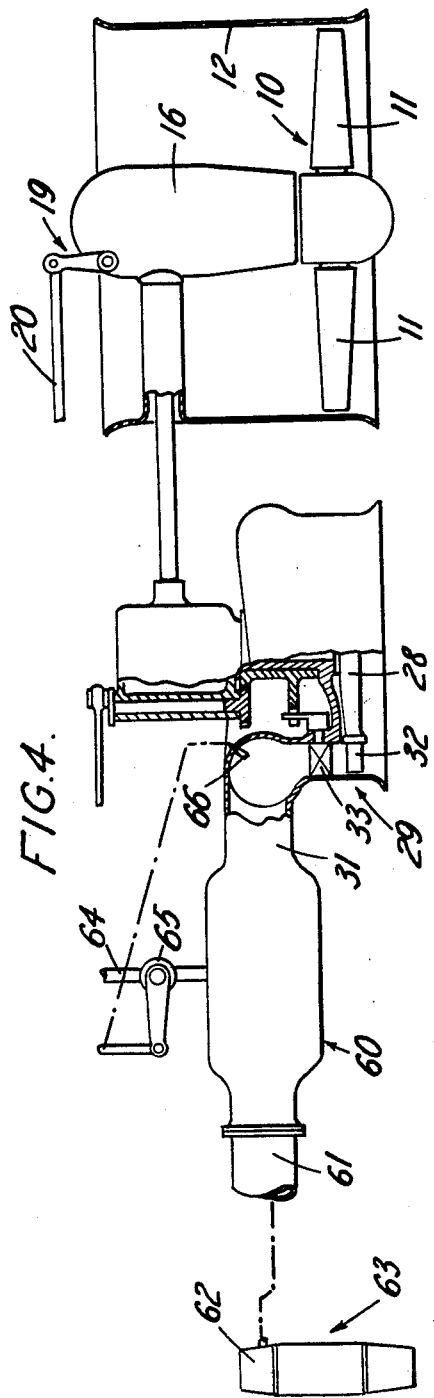
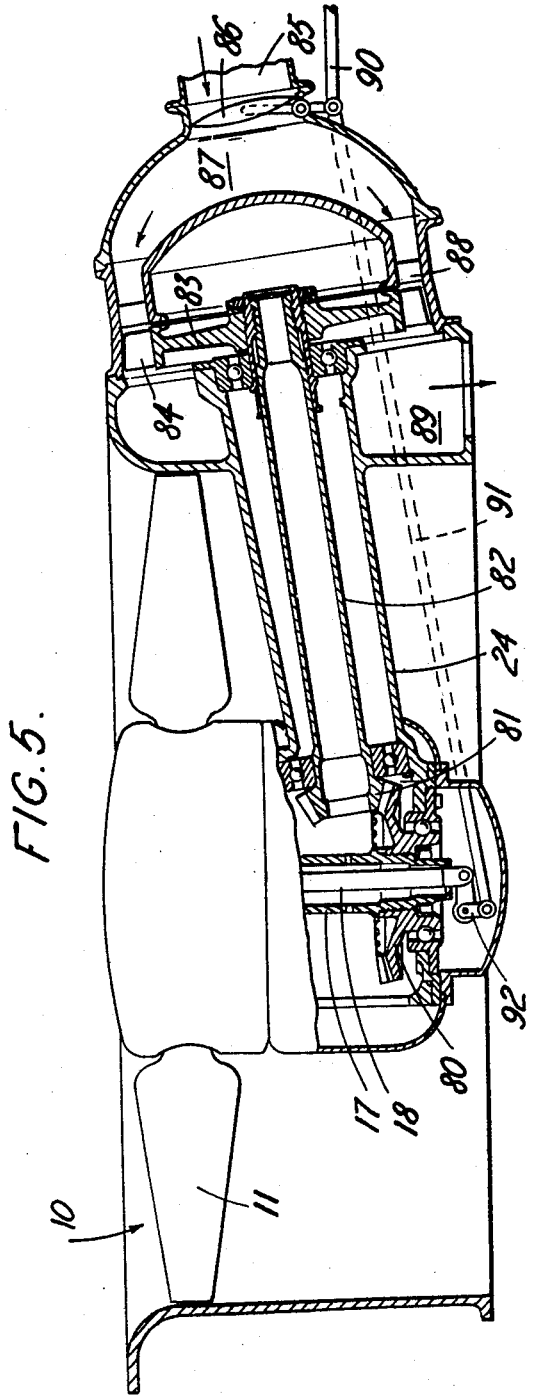

3,120,362
AIRCRAFT CONTROL APPARATUS
John Lloyd Curtis, Edward Hollingworth Morris, and Allen Chivers Walker, Cheltenham, England, assignors to Dowty Rotol Limited, Cheltenham, England, a British company
Filed Nov. 28, 1960, Ser. No. 72,115
Claims priority, application Great Britain Nov. 30, 1959
4 Claims. (Cl. 244—52)

This invention relates to aircraft control apparatus.

According to this invention there is provided aircraft control apparatus comprising a fan casing providing a duct for working fluid, a rotary fan mounted in the casing, a turbine casing fixed to the exterior of the fan casing, a turbine mounted in the turbine casing for rotation about an axis transverse to the axis of rotation of the fan and a drive shaft which extends across the duct and is drivingly coupled at one end to the turbine and at its other end to the fan.

Some embodiments of the invention will now be described by way of example with reference to the accompanying diagrammatic drawings in which:

FIGURES 1 and 2 show diagrammatically two arrangements by which the control apparatus can be used to control aircraft.

FIGURE 3 shows a first embodiment of control apparatus according to the invention.

FIGURE 4 shows a second embodiment of control apparatus according to the invention, and FIGURE 5 shows a third embodiment.

Referring to FIGURES 1 and 2 of the drawings, impellers in the form of fans 10 and 110 provide lift and manoeuvering means for aircraft, particularly short take-off aircraft and vertical take-off aircraft.

In the arrangement of FIGURE 1 the aircraft has a gas-turbine engine 113 for forward propulsion. Nacelles 114 are provided in the wings 115 and main lift fans 110 are mounted in ducts extending through the nacelles to rotate about vertical axes, the resultant thrust of the two fans passing through the centre of gravity of the aircraft. Mounted in the two ends of each nacelle 114 are control fans 10 driven from the main lift fan 110, which is in turn driven by a turbine supplied with working fluid from the engine as hereinafter described. By adjusting the pitch of fans 10 in the manner hereinafter described manoeuvering of the aircraft can be accomplished. Thus the aircraft can be caused to roll by adjusting the pitch of the two fans 10 in the port wing to cause them both to produce a thrust in one direction and adjusting the fans 10 in the starboard wing both to produce a lesser thrust in the same direction, no thrust, or a thrust in the opposite direction. Pitching movement of the aircraft can be accomplished by causing the two forward fans 10 to produce a thrust in one direction and the two rearward fans to produce a lesser thrust in the same direction, no thrust or a thrust in the opposite direction.

In the arrangement of FIGURE 2, the aircraft has gas-turbine engines for forward propulsion installed in nacelles 116 in the wings. A main lift fan 110 is installed in a vertical duct in each wing inboard of the nacelle 116. Pairs of control fans 10a, 10b, 10c and 10d are installed in vertical ducts extending through the aircraft at the nose and tail of the aircraft and adjacent each wing tip. Fans 110 provide lift at least on take-off and landing (and also in flight if required) fans 10a and 10b control pitching of the aircraft and fans 10c and 10d control rolling of the aircraft. The fans are driven by turbines supplied with working fluid from the forward propulsion engines in the manner hereinafter described.

Referring now to FIGURES 3 and 4 of the drawings, corresponding elements in the different arrangements have been indicated by the same reference numerals.

These drawings show control apparatus for aircraft comprising an impeller in the form of a fan. Such fans may be mounted in respective open-ended ducts extending through the wings or fuselage of an aircraft, to produce a thrust normal to the direction of the thrust produced by the main propulsion engine or engines of the aircraft as described above. Each fan is driven by a turbine, and the thrust produced by the fan and the output of the turbine are adjustable under substantially constant speed conditions, that is to say, the thrust of the fan and the output of the turbine are adjustable other than by alteration of the speeds thereof.

Referring to FIGURE 3 of the drawing a fan 10 having variable pitch blades 11 is mounted for rotation in a short open-ended duct 12. The fan blades 11 are pivotally mounted by their radially inner ends in a rotatable boss 13 and are provided on their inner extremities with crank pins 14 which engage in a peripheral groove in a pulley 15. The pulley rotates with the boss 13. The boss 13 is provided with a tubular shaft portion 17 which is mounted for rotation in a centre body 16 which is supported by one or more struts 24 from the duct wall 12. The pulley 15 is rotatably mounted on a shaft 18 which extends centrally through the tubular shaft 17 and is pivotally attached at its upper end to one arm 19a of a bell crank lever 19. The bell crank lever is pivotally mounted on the centre body 16 and its other arm 19b has a rod 20 pivotally attached thereto. It will be seen that by moving the rod 20 lengthwise of itself the bell crank 19 is caused to rock, and this will in turn move the rod 18 and pulley 15 axially to cause rotation of the blades 11 about a span-wise axis to adjust the pitch thereof.

The tubular shaft 17 is provided at its end remote from the boss 13 with a bevel gear 21 which meshes with a bevel gear 22 mounted on one end of a shaft 23, this end of shaft 23 being journaled in a bearing carried by the centre body 16. The shaft 23 extends radially through the wall of the duct 12 and is encased, where it extends across the duct 12 in a strut 24 of aerodynamic cross section so as to minimise the interference with the flow through the duct. Shaft 23 is driven through bevel gears 25, 26 by the rotor shaft 27 of a turbine 29.

Working fluid for driving the turbine 29 enters the casing 30 of the turbine through passage 31 leading to a volute 31a. The blades 32 of the turbine rotor 28 are of fixed incidence and the working fluid is directed on to the blades by variable pitch inlet guide blades 33. The guide blades 33 are pivotally mounted about their spanwise axes in the turbine casing 30 by their radially inner end portions, and their radially inner extremities are provided with arms 34 and the free ends of which engage in notches in the periphery of a wheel 35. The wheel 35 is rotatably mounted on casing structure encircling the rotor shaft 27 and coaxially with rotor shaft 27. The wheel 35 has a sleeve extension formed at its end remote from the turbine rotor with gear teeth 37 which mesh with a gear 39. The gear 39 is mounted on one end of shaft 40 journaled in the casing 30 which shaft extends parallel to the rotor shaft 27 and is provided at its other end with a crank pin 41. One end of an auxiliary link 42 is pivotally connected to the crank pin 41. The arrangement is such that by moving the auxiliary link 42 lengthwise of itself the shaft 40 is turned and drives the wheel 35 through gears 39, 37 to move the arms 34 and adjust the pitch of the inlet guide blades 33.

The links 42 and 20 controlling the pitch of the fan blades 11 and the inlet guide blades 33 respectively are adjusted in conjunction with each other from the pilot's cockpit. In the cockpit a control lever 43 is mounted about a pivot pin 44 and has a downward extension 43a which at its lower end is bifurcated to provide arms 43b. A cam slot 45 extends substantially symmetrically along both arms 43b. A pin 46 is engaged in the slot 45 and is mounted on one arm 47a of a bell crank lever 47, the other arm 47b of which is coupled through a ball joint 48 to the auxiliary link 42. The pivot 49 of the bell crank lever 47 is mounted on a fixed part of the structure. A control rod 50 is pivotally attached by one end to the extension 43a of the control lever 43 at a point between the pivot 44 and the slot 45. The other end of the rod 50 is pivotally attached to one arm of a centrally pivoted lever 51. The other end of the lever 51 is pivotally connected to the lever 20. Thus movement of the control lever 43 from its central position causes pivoting of the bell crank lever 47, due to the engagement of the pin 46 in the cam slot 45, to adjust the pitch of the inlet guide blades 33. The same movement of the control lever 43 causes lengthwise movement of the rod 50 which movement is transmitted to the rod 20 and thence to the rod 18 to adjust the pitch of the fan blades 11. Movement of the lever 43 from its central position in one direction provides positive pitch settings of the fan blades and in the opposite direction provides negative pitch settings. The cam slot 45 provides for adjustment of the inlet guide blades 33 whether the pitch settings of fan blades 11 are positive or negative.

The interconnection between the control lever 43 and the inlet guide blades 33 and the fan blades 11 is such that a change in the pitch of the fan blades 11 to produce a change of the thrust produced by the fan causes an adjustment of the turbine inlet guide blades 33 which provides the necessary adjustment of the power output of the turbine but maintains the speed of rotation of the turbine rotor constant.

In the arrangement of FIG. 3 the gas entering the inlet passage 31 of the turbine 29 is derived from a gas turbine engine 63 constituting the main propulsion unit of the aircraft. The gas may be compressed air derived from the compressor of the gas turbine engine or may be tapped off from the engine downstream of the combustion equipment. In one preferred arrangement the gas turbine engine comprises a two stage turbine and the gas to drive the turbine 29 is tapped off from a point between the two stages.

The embodiment shown in FIGURE 4 is similar to that in FIGURE 3 but is modified in that the inlet 31 to the turbine 29 is connected to the outlet of combustion equipment 60 which receives through a duct 61 compressed air tapped off from the compressor section 62 of the main gas turbine engine 63.

Fuel is supplied to the auxiliary combustion equipment 60 through pipe 64 having a valve 65 which is preferably automatically controlled by a temperature sensitive device 66 in the turbine 29 to give a required constant turbine inlet temperature. Alternatively the fuel supply to the auxiliary combustion equipment 60 may be varied in conjunction with the adjustment of the stator blades 33 to provide a constant speed of the turbine 29 for varying angles of adjustment of the fan blades 11.

In the embodiment described above the control fan 10 has variable pitch blades 11 but no stator blades. In another embodiment however the control fan 10 is provided with inlet guide blades having a fixed pitch.

In a further embodiment the control fan rotor blades are of fixed pitch and inlet guide blades of variable pitch are provided. In this case the thrust of the control fan is varied by varying the pitch of the inlet guide blades thereof. It will be appreciated that with this arrangement it is not possible to obtain reverse thrust with the control fan 10.

In yet another embodiment the control fan 10 has variable-pitch rotor blades and variable pitch inlet guide blades. In this arrangement pitch adjusting means for the two sets of blades of the fan are interconnected in a manner to adjust the pitches of the two sets simultaneously in a predetermined relationship.

The turbine may be a multi-stage turbine provided with intermediate sets of stator inlet guide blades which are adjustable in pitch. Alternatively both the inlet guide blades and the turbine rotor blades may be adjustable. In yet another arrangement the inlet guide blades and rotor blades of the turbine are fixed and the power output of the turbine is controlled by providing a variable constriction of the exhaust nozzle of the turbine.

In yet another arrangement the turbine has fixed rotor blades and inlet guide blades and has an inlet duct the area of which is variable for example by means of a butterfly valve in the inlet duct.

In an aircraft having a number of these turbine driven control fans, each fan may be controlled by a separate manually controlled lever or alternatively more than one control fan may be controlled by the same lever.

More than one control fan may be driven by the same turbine.

The turbine blades may be mounted on the periphery of the control fan rotor blades as described in our co-pending British patent application No. 40,644/59.

In the arrangement of FIGURE 5 the pitch of the fan blades can be adjusted in a manner similar to that described in relation to FIGURE 1 by axial movement of the control rod 18. In this case however the drive shaft 17 of the fan is driven through bevel gears 80, 81 and hollow shaft 82 from a turbine of which the casing is secured to the casing of the control fan. The turbine rotor 83 has blades 84 of fixed pitch. Working fluid to drive the turbine rotor is admitted through an inlet duct 85 under the control of a butterfly valve 86 and thence through an annular working fluid passage 87 provided with inlet guide vanes 88 which have a fixed pitch and which direct the working fluid on to the blades of the turbine rotor. The exhaust gases from the turbine are passed to atmosphere through exhaust ducting 89.

The axis of rotation of the turbine rotor 83 and the hollow shaft 82 is disposed at an angle approaching 90° to the axis of rotation of the fan 10. Where the hollow shaft 82 crosses the fan duct the shaft is enclosed in a hollow casing portion 24 which is of aerodynamic cross-section.

The butterfly valve 86 serves to vary the quantity of working fluid directed on to the turbine blades and hence to vary the output of the turbine. The opening of the butterfly valve 86 is adjusted by a control rod 90 which is adjusted from the pilot's cockpit, and the rod 90 is linked through a rod 91 and bell crank lever 92 to the control rod 18 which varies the pitch of the fan blades. The interconnection of the butterfly valve and the control rod 18 is such that when the thrust produced by the fan 10 is varied, the corresponding adjustment of the butterfly valve 86 which occurs is such as to vary the quantity of working fluid driving the turbine in a sense to maintain the speed of rotation of the turbine rotor 84 substantially constant.

In any of the above arrangements straightening vanes may be provided in the exhaust duct of the impeller downstream of the fan.

We claim:

1. Aircraft control apparatus comprising a fan casing providing a duct for working fluid, a rotary fan mounted in the casing adjusting means for adjusting the thrust produced by the fan, a turbine casing mounted directly upon the exterior of the fan casing, a turbine mounted in the turbine casing for rotation about an axis transverse to the axis of rotation of the fan, adjusting means for adjusting the output of the turbine, a drive shaft which extends across the duct and is drivingly coupled at one end to the turbine and at its other end to the fan, and means interconnecting the two adjusting means to relate the thrust produced by the fan to the output of the turbine and adapted, in operation of the apparatus, to maintain the rotational speeds of the fan and turbine approximately constant.

2. Aircraft control apparatus comprising a fan casing providing a duct for working fluid, a rotary fan mounted in the casing, adjusting means for adjusting the thrust produced by the fan, a turbine casing mounted directly upon the exterior of the fan casing, a turbine mounted in the turbine casing for rotation about an axis transverse to the axis of rotation of the fan, the turbine casing having an inlet for fluid to drive the turbine, adjusting means for adjusting the output of the turbine comprising a single movable valve element adapted to adjust the area of the inlet, a drive shaft which extends across the duct and is drivingly coupled at one end to the turbine and at its other end to the fan, and means interconnecting the two adjusting means to relate the thrust produced by the fan to the output of the turbine and adapted, in operation of the apparatus, to maintain the rotational speeds of the fan and turbine approximately constant.

3. Aircraft control apparatus comprising a fan casing providing a duct for working fluid which duct has an inlet and an outlet, a rotary fan mounted in the duct for driving working fluid through the duct, a turbine casing mounted directly upon the exterior of the fan casing which turbine casing provides a turbine working fluid passage having an outlet which faces in the same direction as the outlet of said duct, a turbine mounted in the turbine casing for rotation about an axis transverse to the axis of rotation of the fan, and a drive shaft which extends across the duct and is drivingly coupled at one end to the turbine and at its other end to the fan.

4. Aircraft control apparatus comprising a fan casing providing a duct for working fluid which duct has an inlet and an outlet, a rotary fan mounted in the duct for driving working fluid through the duct, which fan has blades whereof the pitch is adjustable, a control member for adjusting the pitch of the fan blades, a turbine casing mounted directly upon the exterior of the fan casing which turbine casing provides a turbine working fluid passage having an outlet side-by-side with and facing in the same direction as the outlet of said duct, a drive shaft which is drivingly connected to the fan and which extends across the duct into the turbine casing, a turbine drivingly mounted on the shaft in the turbine casing, an adjusting member for adjusting the quantity of working fluid impinging on the turbine, and a connection between said adjusting member and said control member, for adjusting the fan blade pitch and the quantity of working fluid impinging on the turbine each in dependence on the other.

References Cited in the file of this patent
UNITED STATES PATENTS

| | | |
|---|---|---|
| 2,938,686 | Van Winkle | May 31, 1960 |
| 2,940,689 | Howell | June 14, 1960 |
| 2,940,691 | David | June 14, 1960 |
| 2,988,301 | Fletcher | June 13, 1961 |
| 3,000,445 | Stuart | Sept. 19, 1961 |